United States Patent

[11] 3,576,979

| [72] | Inventors | Amiel J. McCall<br>South Euclid;<br>Ronald D. Elms, Mayfield Heights; Larry<br>D. Rice, Novelty, Ohio |
|---|---|---|
| [21] | Appl. No. | 762,097 |
| [22] | Filed | Sept. 24, 1968 |
| [45] | Patented | May 4, 1971 |
| [73] | Assignee | Allen-Bradley Company<br>Milwaukee, Wis. |

[54] MOTION MONITOR SYSTEM
7 Claims, 4 Drawing Figs.

[52] U.S. Cl. .................................................. 235/151.11,
318/569
[51] Int. Cl. .................................................. G06f 15/46,
G05b 19/18
[50] Field of Search .................................................. 235/151.11
(569); 318/20.110 (571), 20.070 (574), 20.080

[56] References Cited
UNITED STATES PATENTS
3,229,270  1/1966  Rosenblatt ..................  318/162X

| 3,286,085 | 11/1966 | Rado ........................... | 235/151.11 |
| 3,308,279 | 3/1967 | Kelling ........................ | 235/151.11 |
| 3,325,633 | 6/1967 | Lukens ........................ | 235/151.11 |
| 3,351,746 | 11/1967 | Gotz ............................ | 235/151.11 |
| 3,495,775 | 2/1970 | Camillo ....................... | 235/151.11 |

*Primary Examiner*—Malcolm A. Morrison
*Assistant Examiner*—Charles E. Atkinson
*Attorneys*—Arnold T. Ericsen and Richard C. Steinmetz, Jr.

ABSTRACT: A system for monitoring the motion of a numerically controlled machine tool to avoid costly errors. The motion command data that is normally supplied to the machine tool is also supplied to the monitoring system. Additionally, data from the machine tool slide transducers representative of the actual machine tool motion are fed back to the monitoring system. Tolerance data are also supplied to the monitoring system. On the basis of the data supplied thereto, the monitoring system continually determines whether or not a sufficient error exists to shut down the machine tool.

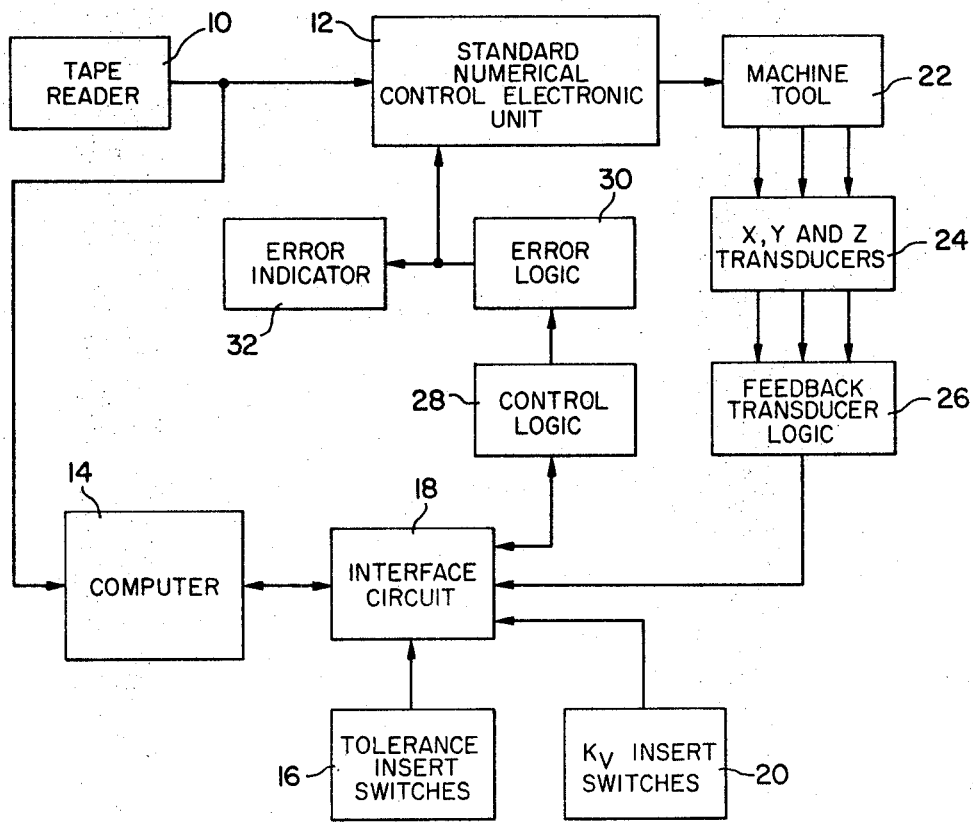

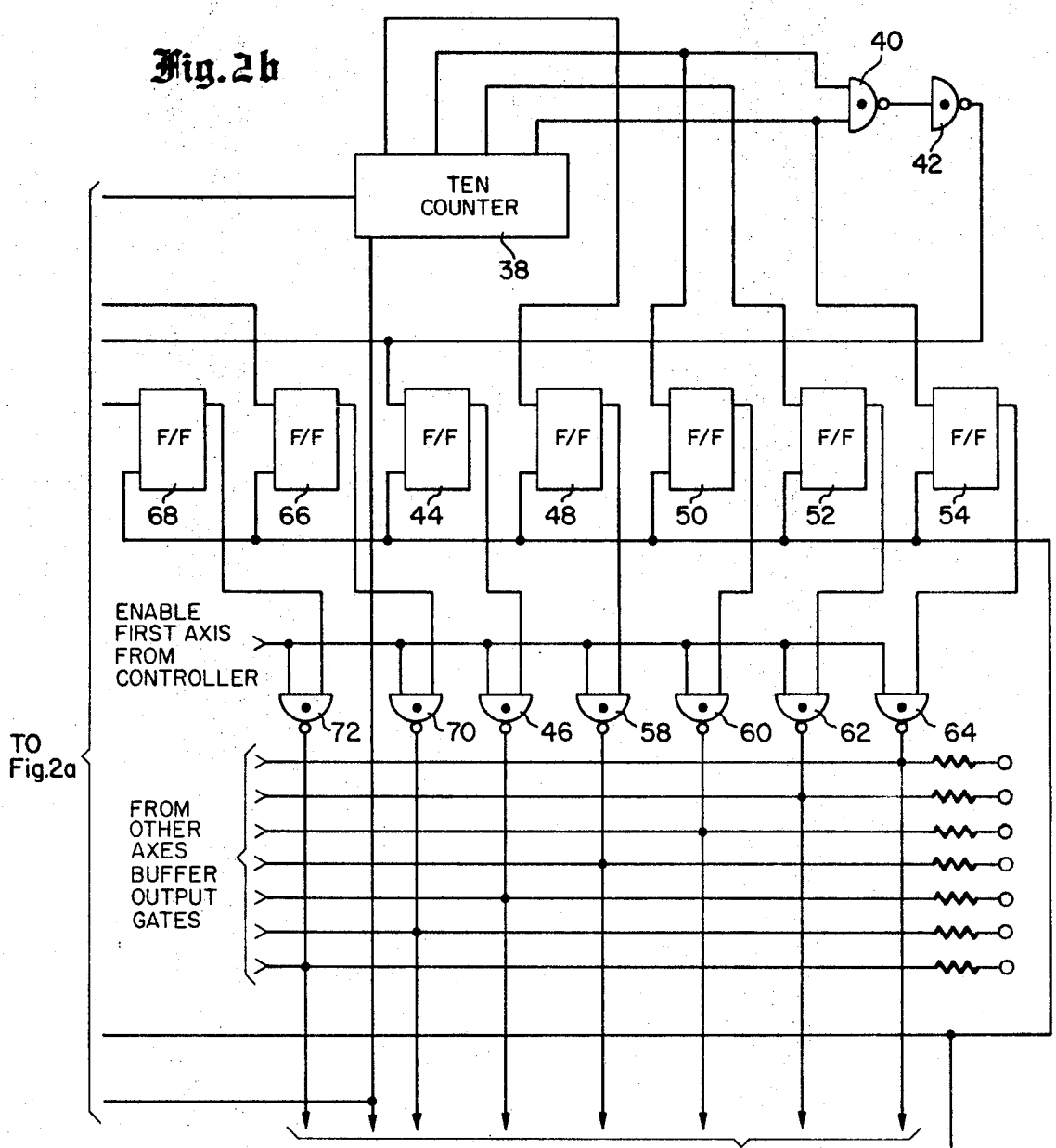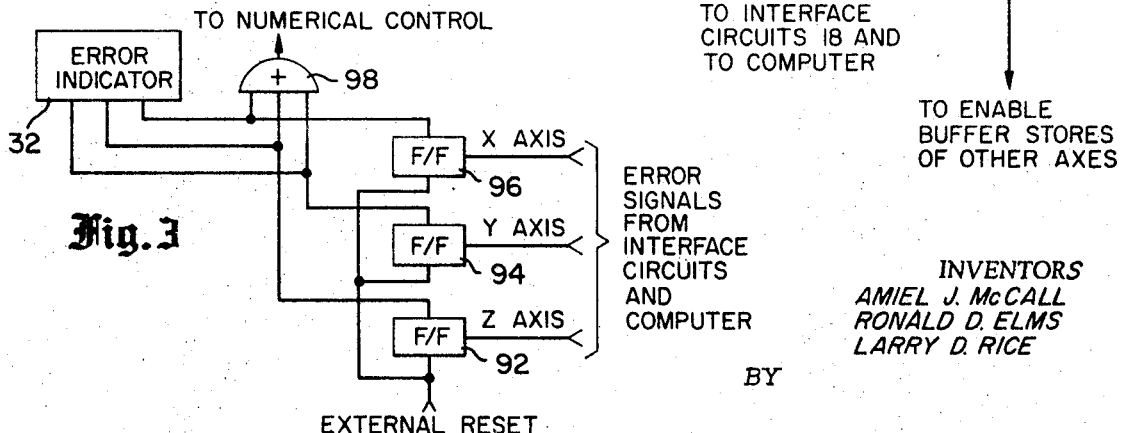

MOTION MONITOR SYSTEM

BACKGROUND OF THE INVENTION

This invention relates to numerically controlled machine tool systems and more particularly to improvements therein.

In the machining of metals by numerically controlled machine tools, all too often a complex part is machined from very exotic and/or expensive metals. The cost of the metal, together with the cost of the long machining time, makes it imperative that any error in machining be detected as soon as it occurs in order that corrective measures can be taken, if at all possible. In any event, the detection of an error avoids the expenditure of further expensive machine time on the particular part which is being made and also points out the location at which a thorough examination should be made to avoid the possiblity of the same error being repeated on succeeding workpieces.

An object of the present invention is to provide a system which monitors the movement of a machine tool for the purpose of determining deviations greater than an acceptable tolerance from command data.

Another object of the present invention is to provide a system capable of stopping the operation of a machine tool in the event of its deviation from a commanded move by more than an acceptable tolerance.

Yet another object of the present invention is to provide a novel and useful system for monitoring the motion of a numerically controlled machine tool.

OBJECTS AND SUMMARY OF THE INVENTION

These and other objects of the invention are achieved by an arrangement wherein the monitoring system receives the motion command data at the same time that such data are supplied to the numerically controlled machine tool. The monitoring system also has fed into it feedback pulses from the slide motion transducers of the various axes of the machine tool, each pulse representing an increment of movement. Logic circuits within the monitoring system count the number of feedback pulses provided with respect to each axis and compare this number with the number which should be provided if the machine tool were perfectly responsive to the command data. This comparison is made on the basis of tolerance data previously supplied to the system, as by an operator. If the comparison indicates that the actual machine tool motion deviates from the commanded motion by greater than the defined tolerances, then an error signal is generated which can be used, for example, to sound an alarm or interrupt the machine tool operation.

The novel features of the invention are set forth with particularity in the appended claims. The invention will best be understood from the following description when read in conjunction with the accompanying drawings.

BRIEF DESCRIPTION OF THE DRAWINGS

FIG. 1 is a block diagram of an embodiment of the invention;

FIGS. 2a and 2b are detailed schematic drawings of the logic circuits required; and FIG. 3 is a block diagram illustrating an embodiment of the error logic shown in FIG. 1.

DESCRIPTION OF THE PREFERRED EMBODIMENTS

Figure 2A:
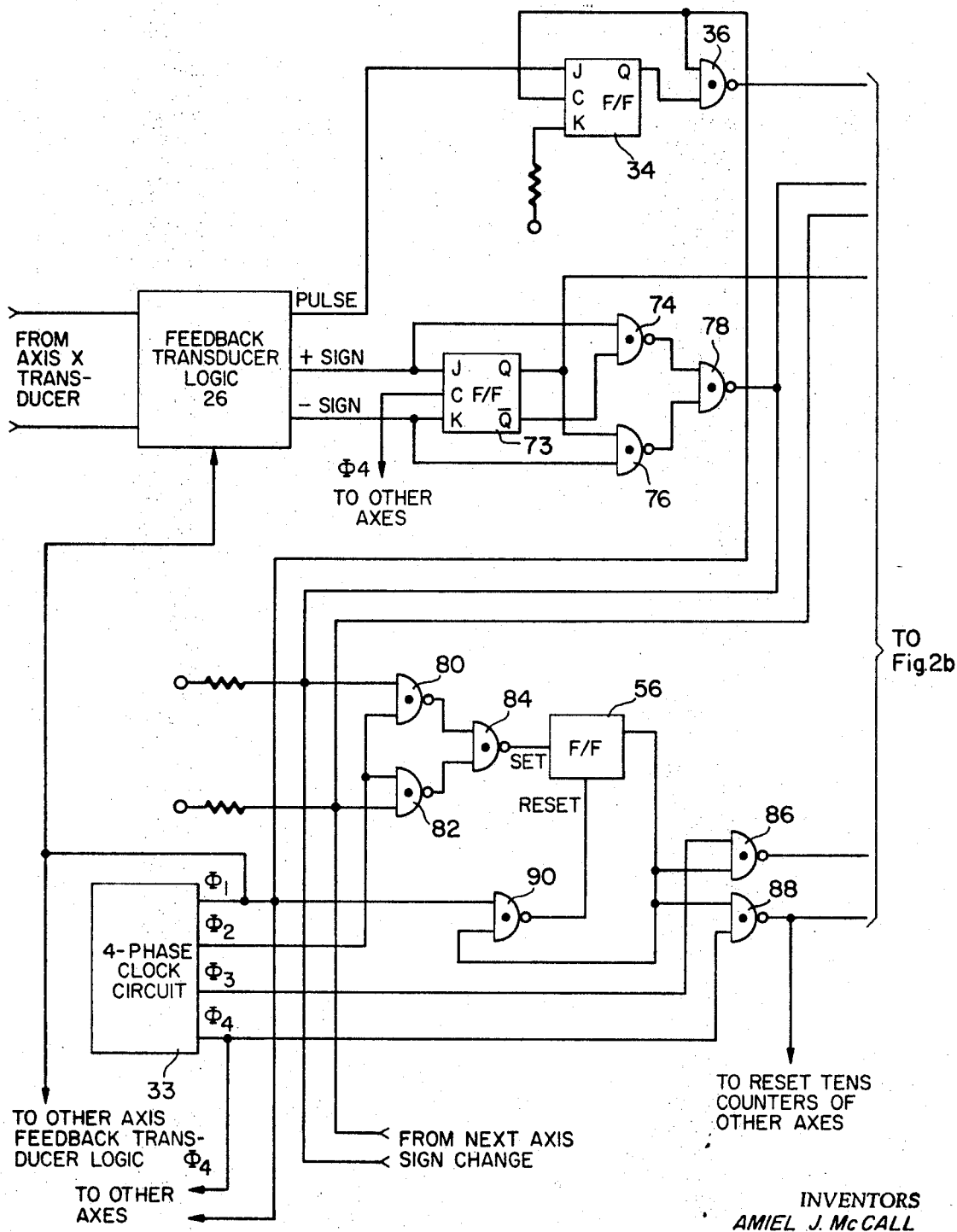

Referring now to FIG. 1, there is shown a block diagram of an embodiment of this invention. A tape reader 10 reads a block of data from a tape (not shown) into both the standard numerical control electronic unit 12 and a general purpose computer 14. A block of data, as is well known, contains motion command words for each axis of the machine tool together with a feedrate word whereby the commanded distances for the various axes are executed within an interval, with the result that the slope or curvature of the path is determined. Also included in the block of data which is read in sign data which instructs a machine tool as to the direction of motion to be executed along an axis. A set of tolerance insert switches 16, which may be potentiometers, are employed to introduce into the computer 14 the allowable error tolerance on either side of a path or paths, the commands for which are to be read from the tape into the tape reader 10. These are introduced into the computer and stored therein through interface circuit 18. In addition, there is a term known as a K factor which is inserted into the computer using $K_v$ insert switches 20, which are connected to the interface circuit. The $K_v$ factor is a number of representative of the velocity gain constant of the servosystem employed with a particular numerical control machine tool. It varies from machine tool to machine tool and is determined empirically in a manner well-known in the art when a machine tool is initially installed for use.

The interface circuit 18 constitutes the usual circuitry employed with a general purpose computer to enable the flow of data into and out of the computer.

The computer 14 is programmed to derive from the block of data read by the tape reader 10 data representative of the largest motion to occur along one of the machine tool axes. Assume, for the purposes of illustration, that the longest motion is to take place along the X axis and the command data indicates that 36 command pulses will be issued for motion along the X axis. Further, by way of illustration, the number of command pulses along the Y axis is indicated as 24, and along the Z axis is indicated as eighteen.

In accordance with this invention, it is desired to inspect the paths being traversed for predetermined motion increments along the major axis. By way of illustration, assume that the motion increment selected is 0.001 inch corresponding to the motion which should occur in response to 10 command pulses. Accordingly, the general purpose computer 14 is programmed to divide the number of X axis command pulses by 10, giving the result 3.6. The general purpose computer 14 is also programmed to thereafter divide the Y and Z axes command pulses for the particular block of data by the number 3.6, giving respectively 6.6 for Y and 5.0 for Z. These latter numbers represent the number of Y and Z pulses which should occur for every 10 X pulses.

The standard numerical control electronic unit 12, in response to the block of data read by the tape reader 10, commands the machine tool 22 to execute the path represented by the block of data. X, Y and Z motion transducers 24, respectively coupled to the X, Y and Z slides (not shown) of the machine tool, produce pulses which indicate the increments of motion moved by the machine tool and by their relative phase indicate the direction or sign of that motion. These are collected and converted to a pulse train and sign data by conventional feedback transducer logic 26.

The information provided by the feedback transducer logic 26 is applied via the interface circuit 18 to control logic 28. The control logic 28, in response to either the collection of 10 pulses from the largest axis, as was determined by the computer 14 or in response to a sign change, transfers the pulses collected for each axis to the computer, which compares the pulses collected for the smaller axes of motion with the numbers which have been stored for these axes by subtraction, for example, and then compares the result with the tolerance values which have been stored. If the tolerance value is exceeded, then the computer initiates a signal through the interface circuit and control logic, which actuates the error logic circuit 30, which in turn actuates the error indicator 32 and/or may instruct the numerical control electronic unit 12 to stop the machine tool.

The general purpose computer 14 which is employed can be any of those commercially available. There are five major routines required for it. The first routine is to receive and store the data from the tape reader 10. The second is to receive and store the data from the tolerance and the $K_v$ insert switches. The third routine is to receive the data from the interface circuit 18. The fourth routine is the routine for computing constants in preparation for the monitoring of motion. The fifth routine is to monitor the motion and determine whether it is out of tolerance.

The operations that the computer performs are those required to support and calculate the following equation:

$$\left\{\begin{array}{l}\text{Remainder of}\\ \text{last check}\end{array}\right\} + \left\{\begin{array}{l}\text{Calculated No.}\\ \text{of input pulses}\end{array}\right\} - \left\{\begin{array}{l}\text{Actual No. of}\\ \text{input pulses}\end{array}\right\}$$
$$= \left\{\begin{array}{l}\text{Remainder for}\\ \text{next check}\end{array}\right\} \leq \text{Tolerance}$$

The calculated number of input pulses is the number which is obtained by dividing the number of pulses along the largest motion axis by 10 and then dividing the number of command pulses for each of the other axes by this quotient. The remainder of last check is the result obtained by subtracting the actual number of input pulses from the calculated number of input pulses for the check which was made previously.

In the event that two axes are to move the same distance, then the first one of these occurring will be selected by the computer as the largest axis. It should be noted that, when the end of a path occurs or there is a sign change, the computer performs a new calculation for purposes of the equation shown above. Also, whenever a new block of data is introduced, a new calculation is undertaken.

FIG. 2 is a block schematic diagram of the control logic as well as the associated logic required for a single axis. The manner in which this may be employed with a multiple axis machine tool will become clear as the explanation progresses. The apparatus operates in response to the output of a four-phase clock circuit 33. The phase one clock is applied to the feedback transducer logic 26, which is then able to emit a pulse on the indicated pulse line and sign signals on the indicated sign lines, as a result of the signals actually received from the X axis transducer coupled to the machine tool slide. At this time, the sign signal has no effect except that the levels on the plus and minus sign lines are enabled to assume a polarity indicative of the sign. A flip-flop 34, which receives the phase one clock pulse as a clock signal, is also enabled to store the pulse signal output of the feedback transducer logic 26.

The Q output of the flip-flop 34 is applied to a NAND gate 36, which is also enabled by the phase one clock pulse to cause a ten counter 38 to advance its count by one. The 10 counter is a binary counter and, when the count of ten occurs, a NAND gate 40 senses this from the first and last flip-flop stages of the binary counter and, through an inverter 42, enters this into a buffer flip-flop 44 of a buffer storage device. Flip-flop 44 has its Q output connected to a NAND gate 46.

The buffer storage device contains not only flip-flop 44, but four other flip-flops respectively 48, 50, 52, 54, which, when enabled by a transfer flip-flop 56 (through gate 86) has transferred into it the contents of the 10 counter 38. This count is then applied to the respective NAND gates 58, 60, 62, and 64.

The buffer storage device also contains a sign change flip flop 66 which stores the fact of the occurrence of a sign change together with a sign flip-flop 68 which stores an indication of the sign. These two flip-flops are also enabled by the output of the transfer flip-flop 56 (via gate 86). The outputs of these two flip-flops are respectively connected to the NAND gates 70 and 72.

A sign change detecting flip-flop 73, responsive to the output of transducer logic 26, has its Q output connected to the input of flip-flop 68 of the buffer storage device. NAND gates 74 and 76 together with NAND gate 78 serve the function of entering a signal indicative of a sign change into the flip-flop 66. NAND gate 74 has as one input the Q output of the flip-flop 73 and as the other input the +sign line. NAND gate 76 has as one input the Q output of flip-flop 73 and as the other input the −sing line. The outputs of these two NAND gates are connected to the NAND gate 78. The output of NAND gate 78 will change whenever there is a change in the sign of the motion of the axis which is being monitored, here the X axis.

Upon the occurrence of a phase two clock signal, an interrogation occurs to determine whether or not a sign change has taken place and whether or not a ten count has taken place. If a full count or sign change condition exists, the transfer flip-flop 56 is set, which enables other operations to be described to occur upon the occurrence of the phase three clock signal. Otherwise the operations to be described in connection with phase three will not occur. The transfer flip-flop 56 is set by the operation of NAND gates respectively 80, 82, whose outputs are connected to a third NAND gate 84. NAND gate 80 provides an output in the presence of a phase two clock pulse when the occurrence of a sign change is indicated by the output of NAND gate 78. NAND gate 82 provides an output in the presence of the phase two clock pulse and the occurrence of a count of ten as determined by the output of NAND gate 42. The occurrence of an output on the part of either NAND gates 80 or 82 causes the transfer flip-flop 56 to be set. When its Q output is high, it provides an enabling signal to both NAND gates 86 and 88.

Upon the occurrence of a phase three clock pulse, NAND gate 86 enables the contents of the flip-flops in the butter storage device, which comprises flip-flops 44, 48, 50, 52, 54, 66 and 68 to be applied to the respective NAND gates 46, 58, 60, 62, 64, 70, and 72. These constitute the data bus outputs to the interface equipment which can then be transferred to the computer.

Upon the occurrence of a phase four clock pulse, the flip-flop 73 can enter the sign change which was enabled on the phase one clock pulse. Also, the NAND gate 88 provides an output to the interface equipment which generates an interrupt signal to the computer to enable it to receive the data which is being provided by the interface signal. Additionally, the output of NAND gate 88 resets the counter 38.

Upon the occurrence of the phase one clock again, the transfer flip-flop 56 is reset through the NAND gate 90, and the cycle which was described commences again with the energy of the next motion pulse into the flip-flop 34 if one had occurred.

Whereas a single four-phase clock circuit 33 and flip-flop 56 and associated gating are required for a monitoring system in accordance with the invention, a set of equipment comprised of a feedback transducer logic, flip-flops for motion increment pulse and sign change, associated gating, 10 counter, buffer store, and their associated gating is required for each axis.

The error logic 30, as shown in FIG. 1, may comprise three flip-flops respectively 92, 94, 96 as shown in FIG. 3. The flip-flops are respectively set by different axis error signals from the computer through the interface circuits, which establish on which axis an out-of-tolerance motion has occurred. The set outputs of these flip-flops are all coupled through an OR gate 98 to the numerical control electronic unit for interrupting further motion. The outputs of the flip-flops are also applied to an error indicator 32 which indicates the particular axis with respect to which the error has occurred.

It is known that, when any slide of a numerically controlled machine tool starts moving, there is initially a period during which it is accelerating up to the speed which it will hold over a major distance or part of the path which it will traverse. Then, as it gets close to the end of the initially directed path, it begins to slow down or to change its velocity. The following error of the machine tool, or difference between distance actually moved with respect to the distance which has been commanded, and which is designated as $E_f$, is different during these initial and end, acceleration, deceleration intervals, and is normally larger than it is during the constant velocity interval. Accordingly, it may be necessary to increase the tolerance limits during the indicated intervals which occur at the beginning and at the end of a commanded path in order to prevent the machine tool from being needlessly shut down. The computer may be programmed to determine when a slide is in the changing acceleration regions within which the increased tolerance must be applied and when these increased tolerance limits should be reduced to the tolerance limit acceptable for the constant velocity region.

The magnitude of the following error can be sensed and the location of a slide along a given path of motion may be determined by the number of feedback pulses received. One can then sense whether the slide is in the beginning changing acceleration region by determining whether the absolute position is less than or equal to the following error. One can determine whether the slide is in the ending changing acceleration region by subtracting from the absolute position of the slide the difference obtained by subtracting from the total distance to be traveled along the path by that slide the following error.

If the slide is within the changing acceleration region, the following error may be computed for each axis from the following equation:

$E_f = F_n \times D$ (for each axis) $K_r$ for each axis where: $F_n$ is the feedrate number, D is the extent of departure for that axis, and $K_r$ is the velocity gain constant for the axis.

The equation for determining the permitted tolerance during a changing acceleration region is as follows:

$$R_n - 1 + 10 \frac{F_2 = P_{u2}}{F_1 = P_{u1}} - A_2 = R_n \leq \text{Tolerance}$$

where $F_2 = C_2(10^2)/K_v$
$F_1 = C_1(10^2)/K_v$
$C_2$ = Count of axis under consideration
$C_1$ = Count of major axes
$P_{u2}$ = Accumulation of distance since beginning of CA of axis under consideration
$P_{u1}$ = Accumulation of distance since beginning of CA of major axis The operation of the control equipment remains as described during the regions of acceleration change.

There has been accordingly described hereinabove a novel and useful system which monitors the motion of a numerical machine tool control to determine whether or not it has departed from predetermined acceptable limits.

The embodiments of the invention in which an exclusive property or privilege is claimed are defined as follows:

We claim:

1. A system for determining whether a machine tool is moving along a commanded path within acceptable limits comprising:
  - means for measuring the increment of motion of said machine tool along each axis which occurs during each of predetermined increments of motion of said machine tool along a selected one of said axis;
  - means for determining the increment of motion of said machine tool along each axis which should occur for each successive predetermined increment of motion along said selected one of said axes; and
  - means for indicating whether the difference between said measured increments of motion along each axis and the determined increments of motion exceed established tolerance limits.

2. Apparatus as recited in claim 1 wherein said means for measuring the increment of motion along each axis during a predetermined increment of motion along said selected one of said axes includes:
  - feedback transducer means for each axis for producing a pulse for each increment of motion along that axis; and
  - means for accumulating the number of pulses from each feedback transducer means.

3. Apparatus as recited in claim 1 wherein said selected one of said axes is the one along which the greatest machine tool motion will occur.

4. Apparatus for determining the accuracy of motion of each of the slides of a machine tool along its axis in response to command data comprising:
  - computer means for generating, responsive to the command data for each slide, signals representative of the number of motion increments each slide should move along its axis relative to a predetermined number of motion increments for the slide along a predetermined axis;
  - feedback transducer means for each of said machine tool slides for generating a feedback pulse for each increment of motion moved in response to command data;
  - means for providing an interval termination signal in response to a predetermined number of pulses from the feedback transducer of the slide moving along said predetermined axis;
  - means for counting the number of pulses provided by said feedback transducers for said axes other than said predetermined axis during an interval whose duration is determined by said interval termination signal;
  - means for comparing the count of the number of pulses provided by each of said feedback transducers during one of said intervals with the signals derived from said command data for each slide by said computer means; and
  - means for determining whether the results of said comparisons are acceptable.

5. Apparatus as recited in claim 4 wherein said predetermined axis is the one along which the greatest number of motion increments will occur.

6. Apparatus as recited in claim 4 wherein each of said feedback transducer means includes means for generating sign signals representative of the direction of motion of a slide along its axis;
  - means for each axis for sensing a change in the sign signals produced by a feedback transducer means; and
  - means responsive to a change in sign signals for providing an interval termination signal.

7. Apparatus as recited in claim 4 wherein said computer means for generating, responsive to command data for each slide, signals representative of the number of motion increments each slide should move along its axis relative to a predetermined number of motion increments for the slide of a predetermined axis includes means for establishing acceptable motion increment tolerances for the number of motion increments each slide should move along its axis; and wherein said means for determining whether the results of said comparison for each of said feedback transducers is acceptable is responsive to said means for establishing acceptable motion increment tolerances.

PO-1050
(5/69)

UNITED STATES PATENT OFFICE
CERTIFICATE OF CORRECTION

Patent No. 3,576,979                    Dated  May 4, 1971

Inventor(s)  Amiel J. McCAll, Ronald D. Elms, Larry D. Rice

It is certified that error appears in the above-identified patent and that said Letters Patent are hereby corrected as shown below:

| | | |
|---|---|---|
| Column 1, Line 75 | "in" should be | -- is -- (second occurrence |
| Column 2, Line 8 | "K factor" should be | -- $K_v$ factor -- |
| Column 3, Line 26 | after "for" insert | -- the -- |
| Column 4, Line 24 | "butter" should be | -- buffer -- |
| Column 4, Line 40 | "energy" should be | -- entry -- |
| Column 5, Line 18 | after "axis)" insert | -- $\div$ -- |

Signed and sealed this 7th day of December 1971.

(SEAL)
Attest:

EDWARD M. FLETCHER, JR.         ROBERT GOTTSCHALK
Attesting Officer                Acting Commissioner of Patents